US011005937B2

(12) United States Patent
Dowlatkhah et al.

(10) Patent No.: US 11,005,937 B2
(45) Date of Patent: *May 11, 2021

(54) SYSTEM AND METHOD TO ENABLE SENSORY DATA FOR ANY DEVICES CONNECTED TO A PHONE IN A 5G NETWORK

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/918,429

(22) Filed: Jul. 1, 2020

(65) Prior Publication Data

US 2020/0336538 A1  Oct. 22, 2020

Related U.S. Application Data

(63) Continuation of application No. 15/661,875, filed on Jul. 27, 2017, now Pat. No. 10,721,303.

(51) Int. Cl.
*H04L 29/08* (2006.01)
*H04L 12/24* (2006.01)
(Continued)

(52) U.S. Cl.
CPC ...... *H04L 67/1097* (2013.01); *H04L 41/0893* (2013.01); *H04M 1/72409* (2021.01);
(Continued)

(58) Field of Classification Search
CPC ..... H04W 8/18; H04W 84/042; H04W 8/186; H04L 41/0893; H04L 67/1097; H04M 1/72527; H04M 1/72409
See application file for complete search history.

(56) References Cited

U.S. PATENT DOCUMENTS 9,306,897 B2   4/2016  Luna et al.
9,572,499 B2   2/2017  Gopalakrishnan et al.
(Continued)

FOREIGN PATENT DOCUMENTS

CN   204318733 U   5/2015
EP     2492831 A1   8/2012
(Continued)

OTHER PUBLICATIONS

Ajami et al.; "Features and application of wearable biosensors in medical care"; Journal Research in Medical Sciences; vol. 20; Dec. 2015; p. 1208-1215.
(Continued)

*Primary Examiner* — Brandon J Miller
(74) *Attorney, Agent, or Firm* — BakerHostetler

(57) ABSTRACT

A method of sharing information between an external device and a portable processing device in communication with the external device, including the steps of the portable processing device evaluating policy restrictions associated with the external device, evaluating requested data by the external device in view of the policy restrictions, if the requested data may be shared with the external device, then the portable process device providing access to the data requested. The method may further include setting policy restrictions as a function of the external device, 3rd party security requirements, subscriber preferences and/or predefined mobility network policies.

13 Claims, 4 Drawing Sheets

(51) Int. Cl.
*H04W 8/18* (2009.01)
*H04M 1/72409* (2021.01)
*H04W 84/04* (2009.01)

(52) U.S. Cl.
CPC .............. *H04W 8/18* (2013.01); *H04W 8/186* (2013.01); *H04W 84/042* (2013.01)

(56) References Cited

U.S. PATENT DOCUMENTS

| | | | |
|---|---|---|---|
| 9,619,213 | B2 | 4/2017 | Gupta et al. |
| 9,781,602 | B1 | 10/2017 | Girdhar et al. |
| 9,986,086 | B2* | 5/2018 | Kim .................. H04M 1/72577 |
| 10,721,303 | B2* | 7/2020 | Dowlatkhah ........... H04W 8/18 |
| 2012/0089781 | A1 | 4/2012 | Ranade et al. |
| 2013/0089781 | A1 | 4/2013 | Miyazaki et al. |
| 2014/0155705 | A1* | 6/2014 | Papadopoulos ...... A61B 5/0004 |
| | | | 600/301 |
| 2014/0173089 | A1 | 6/2014 | Li et al. |
| 2014/0159912 | A1 | 7/2014 | Fraden et al. |
| 2015/0012639 | A1 | 1/2015 | McLean |
| 2015/0065085 | A1 | 3/2015 | Sheikh Naziruddin et al. |
| 2015/0186636 | A1 | 7/2015 | Tharappel et al. |
| 2015/0355800 | A1* | 12/2015 | Cronin ................ G06F 11/3409 |
| | | | 715/835 |
| 2016/0026729 | A1 | 1/2016 | Gil et al. |
| 2016/0034696 | A1 | 2/2016 | Jooste et al. |
| 2016/0117937 | A1 | 4/2016 | Penders et al. |
| 2016/0182685 | A1 | 6/2016 | Moran et al. |
| 2016/0232318 | A1 | 8/2016 | Mensinger et al. |
| 2016/0283934 | A1* | 9/2016 | Cheng ................. G06Q 20/3224 |
| 2016/0314185 | A1 | 10/2016 | Buchanan et al. |
| 2016/0328576 | A1 | 11/2016 | Howley |
| 2017/0006135 | A1 | 1/2017 | Siebel et al. |
| 2017/0010666 | A1 | 1/2017 | Tanaka et al. |
| 2017/0026238 | A1 | 1/2017 | Pignataro et al. |
| 2017/0039480 | A1 | 2/2017 | Bitran et al. |
| 2017/0041391 | A1 | 2/2017 | Vasyutynskyy |
| 2017/0049374 | A1 | 2/2017 | Eldardiry et al. |
| 2017/0091412 | A1 | 3/2017 | Johnson |
| 2017/0155703 | A1 | 6/2017 | Hao et al. |
| 2017/0163715 | A1 | 6/2017 | Fang |
| 2017/0163716 | A1 | 6/2017 | Jang et al. |
| 2017/0289800 | A1 | 10/2017 | Frusina |
| 2018/0034945 | A1 | 2/2018 | Zimmerman |
| 2018/0035297 | A1* | 2/2018 | Cronin .............. H04W 12/0013 |
| 2018/0103039 | A1 | 4/2018 | Thaler et al. |
| 2018/0115550 | A1 | 4/2018 | Sapir et al. |
| 2018/0288095 | A1 | 10/2018 | Shaw et al. |
| 2018/0343024 | A1* | 11/2018 | Sahebjavaher ..... H04M 1/0202 |

FOREIGN PATENT DOCUMENTS

| | | |
|---|---|---|
| KR | 2015-0137744 A | 12/2015 |
| WO | WO 2016/014282 A1 | 1/2016 |
| WO | WO 2016/124495 A1 | 8/2016 |
| WO | WO 2017/008321 A1 | 1/2017 |

OTHER PUBLICATIONS

Walsh et al; "Device Connectivity: The Next Big Wave in Diabetes"; Journal of Diabetes Science and Technology; vol. 9; May 2015; p. 701-705.
Shoaib et al.; "Fusion of Smartphone Motion Sensors for Physical Activity Recognition"; Sensors; vol. 14; 2014; p. 10146-10176.
Banos et al.; PhysioDroid: Combining Wearable Health Sensors and Mobile Devices for a Ubiquitous, Continuous, and Personal Monitoring:; The Scientific World Journal; vol. 2014; 2014; 11 pages.
C. Lee Ventola; "Mobile Devices and Apps for Health Care Professionals: Uses and Benefits"; P & T; vol. 39 No. 5; May 2014; p. 356-364.
Sposaro et al.; "iWander: An Android Application for Dementia Patients"; IEEE Engineering in Medicine and Biology Society; 2010; 4 pages.

* cited by examiner

SYSTEM AND METHOD TO ENABLE SENSORY DATA FOR ANY DEVICES CONNECTED TO A PHONE IN A 5G NETWORK

CROSS REFERENCE TO RELATED APPLICATIONS

This application is a continuation of, and claims priority to, U.S. patent application Ser. No. 15/661,875, filed Jul. 27, 2017, entitled "System And Method To Enable Sensory Data For Any Devices Connected To A Phone In A 5G Network," the entire contents of which are hereby incorporated herein by reference.

TECHNICAL FIELD

The invention relates to systems and methods for enabling sensory data from a number of devices connected to a phone in a 5G network to be stored in a common data repository and shared dynamically.

BACKGROUND

Fifth generation (5G) mobile networks are being designed for deployment over the next couple of years. 5G networks offer higher data capacity than current 4G mobile networks, thus allowing a higher density of mobile broadband users, and support ultra-reliable device-to-device massive machine communications. Proposed 5G systems offer data rates of tens of megabits per second for tens of thousands of users as well as data rates of 100 Mb/sec for metropolitan areas in the approved spectra of 28 GHz, 37 GHz, and 39 GHz. Data rates of 1 Gb/sec may be provided simultaneously to many workers on the same office floor. In addition, and important for the present invention, is that 5G enables a higher number of simultaneously connected devices such as several hundreds of thousands of simultaneous connections for wireless sensors with latency that is reduced significantly compared to LTE.

Today's smart phones have access to approximately 20 integrated and/or add-on sensory devices ranging from gyroscopes to GPS capability. The applications in the smart phone can access these sensory devices and utilize the data generated by those sensory devices in different applications implemented on the smart phone. Each of these sensors has a given cache storage or temporary database that is accessed by the smart phone application by querying the specific memory address in the smart phone. Some applications, such as that described in US 2016/0232318, permit different sensing applications on a smart phone to share information for display or, such as that described in US 2017/0010666, enable a smart wearable device to identify surrounding smart devices that my provide additional sensor data that may be used to augment incomplete data, correct incorrect sensor data, activate a function on the device, or activate a function on one or more of the surrounding smart devices. However, such devices just share data, not capabilities, and have potentially serious security issues by permitting the data to be shared between applications. This is particularly problematic when the shared data is medical data.

Typically, other devices attached to the smart phone such as a smart watch, FITBIT™, or even medical devices need to have their own sensory devices and are restricted from accessing the data from other sensory devices stored in the device in order to maintain security over medical information, for example. However, with the advent of 5G mobile networks enabling a high number of simultaneously connected devices, it is now possible and desirable to develop a system that permits the data from a plurality of the connected devices to be shared without jeopardizing data security.

This disclosure is directed to providing a system and method for the data from a plurality of the devices connected to a smart phone to be stored in a common data repository and shared dynamically based on policy/security settings.

SUMMARY

The system and methods described herein address the aforementioned needs in the art by, for example, enabling peripheral sensory devices of a smart phone, tablet computer, desktop computer, or laptop computer to dynamically share data with integrated or other add-on sensory devices such as GPS enabled devices of a smart phone through a common repository on the device. The common repository allows/enables a particular app on the phone to share data with any other app or integrated or add-on sensor if the particular app has the appropriate access rights/security policy. As an example, an app on a GPS-enabled watch would be able to access a database on the wearer's smart phone populated by an application that uses the smart phone's GPS. The watch itself would not need GPS capability. As will become apparent from the following description, the same approach would be used for any of a variety of other types of sensors attached to the smart phone, tablet computer, desktop computer, or laptop computer.

To implement such a system, however, it must be recognized that the computing device has to have a number of security and policy restrictions that need to be enforced in order to comply with an array of compliances for a number of applications. For instance, health care information cannot be accessible by other applications for obvious reasons and the user's bank credential cannot be stored unprotected for snoopers or malicious applications to obtain. There are a number of reasons why some applications have access to only some part of the smart device and for the same reason devices operate in a Trusted Execution Environment (TEE) to completely separate open information from restricted information. As known to those skilled in the art, the TEE is a secure area of the main processor of a smart phone (or any connected device including tablets, set-top boxes and televisions). The TEE guarantees code and data loaded inside to be protected with respect to confidentiality and integrity. The systems and methods used herein permit peripheral sensory devices to interact with the TEE through use of dynamic policy and security settings.

In exemplary embodiments, a method is provided for sharing information among a plurality of sensor devices that provide sensor data to a portable processing device. The method includes the steps of using the portable processing device to evaluate security and policy restrictions to data captured by sensor devices of the plurality of sensor devices, storing received data from the sensor devices in a common repository accessible by secure and non-secure applications of the portable processing device in accordance with the security and policy restrictions of the received sensor data, data which includes the subscriber preferences (which can be changed by user at any time dynamically), 3rd party security requirements and predefined mobility network policies, and determining whether sensor data stored in the common repository is more recent to sensor data received from a sensor device and, when so, updating the sensor device with the more recent sensor data as permitted by the security and policy restrictions on the sensor data from the sensor device.

In other exemplary embodiments, sensor data from the common repository is shared with different slices initiated by a sensor device in a 5G network as permitted by the security and policy restrictions on the sensor data to be shared.

In still other exemplary embodiments, the plurality of sensor devices comprises at least one wearables device that provides wearables sensor data to a cloud server associated with the at least one wearables device. The sensor data stored in the common repository from other sensor devices associated with the portable processing device is provided with the wearables sensor data provided to the cloud server by the at least one wearables device.

In the exemplary embodiments, access to the common repository is controlled using a policy module that implements the security and policy restrictions on the sensor data from the plurality of sensor devices. The security and policy restrictions may be modified to reflect a user preference regarding access to sensor data stored in the common repository, a carrier-related policy regarding access to sensor data in the common repository, and/or a service-agreed rule associated with a trusted application associated with the sensor data stored in the common repository. The sensor data in the common repository also may be stored based on type of sensor data, wherein a sensor device may request data from the common repository based on the type of sensor data irrespective of the sensor device used to obtain the sensor data of the requested type.

In an aspect, the disclosure is directed to a method of sharing information between an external device and a portable processing device in communication with the external device, including the steps of the portable processing device evaluating policy restrictions associated with the external device, evaluating requested data by the external device in view of the policy restrictions, if the requested data may be shared with the external device, then the portable process device providing access to the data requested. The method may further include setting policy restrictions as a function of the external device, 3rd party security requirements, subscriber preferences and/or predefined mobility network policies. The method may further include storing portable processing device data in memory associated with the portable processing device and making the device data available to the external device wherein the memory is a common repository on the portable processing device or is located in a personal cloud-based storage area. The portable processing device data may be derived from hardware or software on the portable processing device and wherein the portable processing device data is time-stamped such that the most recent portable processing device data is made accessible to the external device or if outdated, more recent portable processing device data is generated and made accessible to the external device. The method may further include storing external device data using the portable processing device in accordance with the policies, wherein the external device data is stored in a common repository on the portable device and wherein the external device data is made available to a second external device connected to the portable device in accordance with policies. In an aspect, the external device data may be stored in a personal-cloud-based storage area and wherein the external device data is made available to an external application with access to the cloud-based storage area in accordance with the policies.

In accordance with the present disclosure, there is a system including a portable processing device capable of communicating on a 5G network, cloud-based storage accessible by the portable processing device, an external device in communication with the portable processing device wherein the external device has access to the cloud-based storage through the portable processing device and a policy control module configured to apply policies associated with the storage and retrieval of data stored in the cloud-based storage as a function of the external device and a security level of the data, wherein the external device in combination with the portable processing unit uses a network slice of the 5G network for processing and storage of the data. The data may be made available to other external devices or applications in accordance with the policy. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION OF ILLUSTRATIVE EMBODIMENTS

Figure 1:
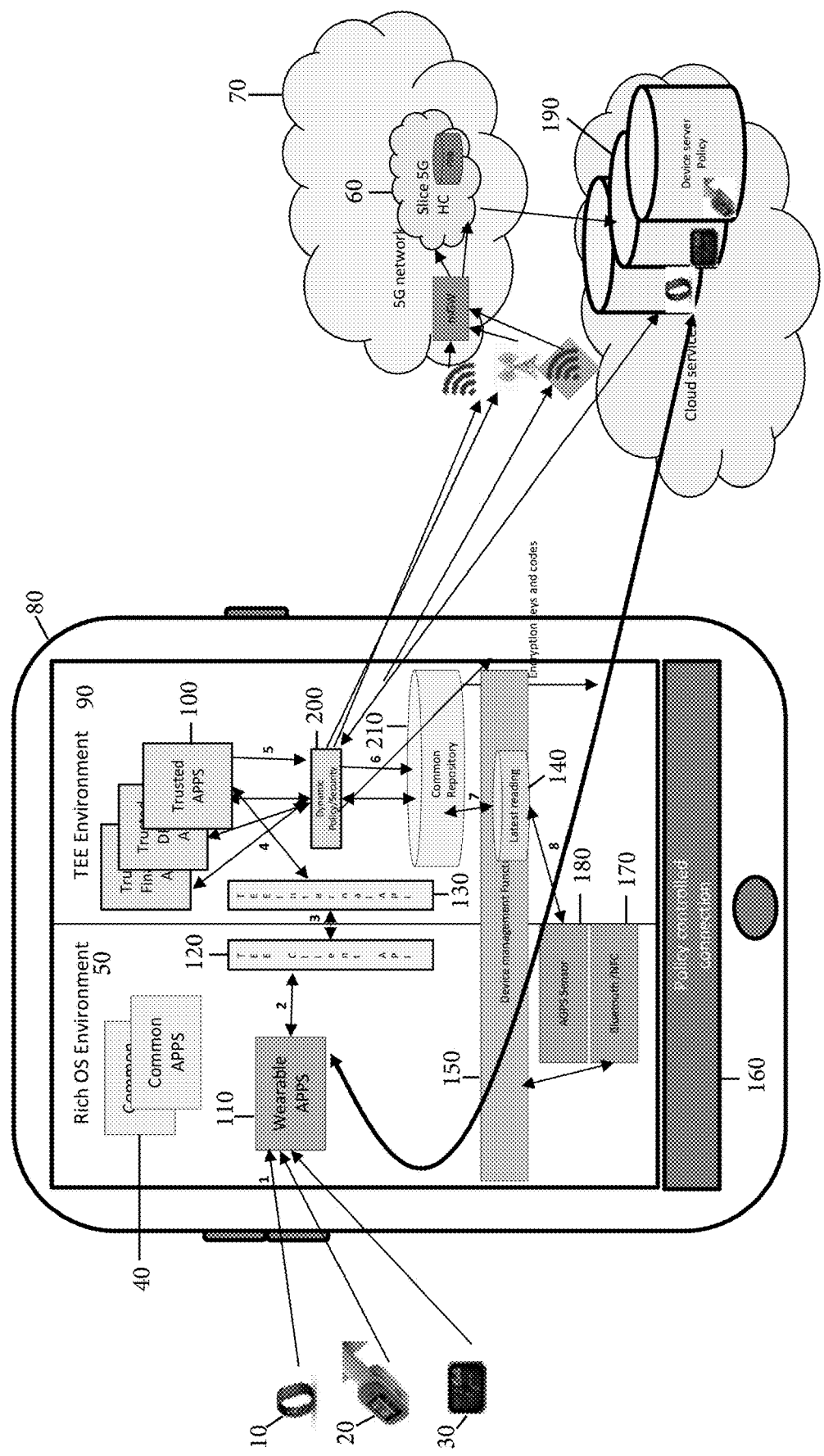
FIG. 1 illustrates an exemplary embodiment of a smart phone that is adapted to send sensory information to/from a number of peripheral and integrated or add-on sensory devices as metadata to a $3^{rd}$ party service provider in a 5G network.

The invention described herein may be understood more readily by reference to the following detailed description taken in connection with the accompanying figures and examples, which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments of the invention will now be described with reference to FIG. 1. Although this description provides a detailed example of possible implementations of the invention, it should be noted that these details are intended to be exemplary and in no way delimit the scope of the invention.

System Overview. The system and methods described herein enable periphery devices that can connect to a device such as a smart phone to share sensory data generated by the smart phone or data from another peripheral device which is also connected to the smart phone. For example, a smart phone may have GPS or a GPS functionality, accelerometers, speakers, microphones or other functions. The systems and method of the present disclosure may make the data from such smart phone functions accessible by a peripheral device that does not have that capability. For example, a connected watch may not have native GPS capability, but when connected to a smart phone, may use the GPS capability of the smart phone to provide location information to the user of the watch. In another embodiment, the system and methods of the present disclosure may enable sensory data from a number of add-on and integrated devices (20-30 or more) of a smart phone in a 5G network to be shared with other peripheral devices through the smart phone in secure and non-secure processing environments without compromising security of the data stored on the smart phone. In accordance with the present disclosure, within the 5G access agnostic network information can be categorized and shared with other device/applications, such as wearables, according to policy rules and preferences (e.g., what can be stored and/or shared and when). The systems and methods described herein extend such policy rules and preferences to peripheral devices through those set on the smart phone.

Operating Environment. FIG. 1 illustrates an exemplary architecture of device 80. Generally, device 80 may be a computing device adaptable to connect to and communicate with a network. For example, device 80 may be a user device, such as a smart phone, tablet, desktop computer, or laptop computer. For ease of description, device 80 will hereafter be referred to a "device" or a "smart phone."

In exemplary embodiments, device 80 may have multiple computing environments. Each computing environment may include a set of hardware and software components to support the respective applications that operate in that environment. The environments may include an operating system (OS) environment 50 and a Trusted Execution Environment (TEE) 90. For example, OS environment 50 may be the environment defined by the OS of device 80. This may be referred to as the normal environment or the rich OS environment 50. For example, OS environment 50 may include an operating system such as a mobile OS or the like. Additionally, one or more common applications 40 such as client applications may operate within OS environment 50.

Common applications 40 running in the rich OS environment 50 may not require any special security beyond what is considered to be normal and prudent security. For example, a weather application that tracks daily temperature ranges comprises generally publically available information and the sensitivity of that data may not be as great as data that tracks a user's daily blood pressure. In that case, common applications 40 running in the rich OS environment may also store the data generated by the common applications 40 in a common repository 210.

TEE 90 may comprise a secure area of a main processor of device 80. TEE 90 may provide hardware-based isolation from OS environment 50. TEE 90 may be used to isolate and protect code and data loaded within TEE 90 to maintain the confidentiality of such code and data, and to prevent such code or data from being tampered with or otherwise compromised. TEE 90 may typically be more secure than the rich OS environment 50 and may offer a higher level of functionality than a secure element using a hybrid approach that utilizes both hardware and software to protect data. TEE 90 therefore offers a level of security sufficient for most applications. Trusted applications 100 running on TEE 90 have access to the full power of the device's main processor and memory while hardware isolations protect the trusted applications 100 from user installed apps such as wearable apps 110 running in the rich OS environment 50. Software and encryption isolation inside the TEE 90 may further protect the trusted applications 100 contained within the TEE 90 from each other.

For example, by restricting which applications may run or access TEE 90, TEE 90 may be protected from interference by malware. Access to TEE 90 from outside of TEE 90, such as from OS environment 50 or from another device external to device 80, may be restricted. Also, a TEE kernel may control operations of TEE 90 and elements of TEE 90. For example, TEE 90 may include trusted applications 100 that operate and store data within TEE 90. For example, a trusted application 100 may be one that requires certain heightened security, such as identification-based access (e.g., fingerprint authorization, voice recognition authorization) and mobile commerce applications (e.g., mobile wallets, peer-to-peer payment technology) that may particularly benefit from the heightened security of TEE 90. Other trusted applications 100 may include applications for interfacing with internet of things (IOT) devices, such as security applications for controlling home security technologies, wearable device applications for interfacing with wearable devices, network connectivity applications for connecting to communication networks, or the like. However, the type or function of trusted applications 100 may not be what distinguishes trusted applications 100 from common applications 40. The difference simply may be that trusted applications 100 operate in TEE 90, and common applications 40 operate in OS environment 50.

Common applications 40 and trusted applications 100 may generate or store data within device 80. For example, common applications 40 may store data in (or accessible through) OS environment 50, while trusted applications 100 may store data in (or accessible through) TEE 90. Because of the secure nature of TEE 90, each trusted application 100 may have a designated memory or area within memory for storing its data, such that only that trusted application 100 may access that memory designated as accessible to that trusted application 100. It will be appreciated that restricting access to trusted-application data to the trusted application 100 from which it originated may have certain security advantages.

FIG. 1 also shows a common repository 210 which may, for example, comprise storage for data that may be shared based on the policy considerations to be set forth in more detail below. For example, data related to functionality native to device 80 such as a GPS sensors 180 and Bluetooth/NFC functionality 170 may be stored in common repository 170. Other data native to device 80 not shown may, for example, include accelerometer data, time of day or other calendar data, video or audio data, or any other type data generated locally by device 80. Additionally, common repository 210 may also comprise data generated by common applications 40, including but not limited to weather applications, traffic applications, travel applications, and any other common applications 40. Finally, subject to policy considerations, certain trusted applications 100 running in the TEE environment 90 may store some data in a common repository 210.

FIG. 1 also illustrates communications between device 80 and external elements. Device 80 may be affiliated with one or more connected devices 10, 20, 30, such as healthcare monitors, fitness monitors, smartwatches, navigation tools, wearables, implants, or other IOT devices. Such connected devices 10, 20, 30 may link to device 80 via Bluetooth® or NFC technologies, wired connections, or other wireless communications. Subject to policy considerations, connected devices 10, 20 and 30 may store data in the common repository 40 or retrieve data from the common repository 40.

Access and Use of Common Repository Data. Subject to policy considerations, common applications 40, connected devices 10, 20, 30 or trusted applications 100 operating in TTE 90 may have the ability to access a common repository 210 in which at least some data generated or stored by common applications 40, trusted applications 100, connected devices 10, 10 30 or native device data, Access to common repository 210 (and to certain data stored within common repository 210) may be controlled by a policy module 200. For example, policy module 200 may include certain policies (or rules) that restrict access to application data based on one or more factors, such as the identity of a source (e.g., trusted application 100 or external device) that stored application data in common repository 210, the identity of the element (e.g., trusted application 100 or external device) seeking access to the application data in common repository 210, a type of the application data, a location of the application data within common repository 210, or any other characteristic, such as a time of day, a network connection status, a battery power level, which trusted (or common) applications are actively running (as opposed to running in the background of device 80) or the like.

The policies of policy module 200 may include policies from one or more sources. For example, user-preference policies may be those policies selected by a user that dictates what data is being shared and with which elements that data is being shared. User-preference policies may be changed dynamically. That is, a user may change a user-preference policy by updating their preference through their device settings menu. Further, these policies may be based on one or more factors or originate in one or more ways. For example, when a user links a wearable device, such as a fitness monitor 10, to device 80, a prompt may ask a user to indicate which other devices 20, 30, common applications 40 or trusted applications 100 (if any) that user wishes to have access to that data and under what circumstances that access should be permitted or denied. For example, a user may indicate that any medical trusted application 100 running in TEE 90 may access and use the data from fitness monitor 10. Such sharing of data would then enable medical trusted application 100 to analyze the fitness data as part of a health monitoring program. Likewise, the user may elect a policy by which global positioning system (GPS) information native to device 80 may be shared with fitness device 10 or other wearable devices 20, 30. By sharing GPS information generated by GPS chip on device 80, the need for a wearable device, such as a fitness device 10 that tracks movement, to have a GPS chip (e.g., to map the user's runs to a geographic map) may be eliminated.

As another example, policies of policy module 200 may include service-agreed rules. A service-agreed rule may be a policy that acceptance of which by the user is required by a service provider to provide that certain service. For example, a service provider may require that access to any data collected or generated by its trusted application 100 be restricted to only other trusted applications 100 of that service provider, or that specific trusted applications 100 (such as those trusted applications 100 of a competitor of that service provider) be specifically excluded be prevented from accessing data generated or stored by the service provider's trusted application 100. As another example, a service-agreed rule may be a policy that requires the service provider's trusted application 100 to access certain application data of other trusted applications.

As another example, policies of policy module 200 may include carrier-related policies. For example, a telecommunications carrier may restrict or control access to data from its trusted applications 100. Conversely, a telecommunications carrier may require, as a condition of providing access to the telecommunications network, access to certain application data of other trusted applications 100. Similarly, a telecommunications carrier may provide incentives for a user to agree to optional carrier-related policies, such as increased quality of service, decreased costs, or other incentives.

As another example, policy module 200 may include healthcare information policies. For example, certain healthcare information may be subject to privacy laws and regulations, such as the Health Insurance Portability and Accountability Act (HIPAA). This information may have certain legal restrictions that limit how such information may be shared. Additionally or alternatively, certain legal restrictions may dictate minimum security measures to protect such information. For trusted application data that includes information subject to such regulations, policies of policy module 200 may limit how such application data is shared, even among trusted applications 100.

Policy module 200 may have a certain hierarchy in which certain policies are applied. For example, if a service-agreed rule requires that certain application data be shared, but a healthcare information policy prohibits sharing that information without a user preference indicating that the user has authorized such information to be shared, then policy module may override the service-agreed rule—which may or may not have an effect on the services provided by that service provider—and deny access to the healthcare information by any other application. Alternatively or additionally, the user may be prompted to grant the healthcare information-related permissions to eliminate this conflict of policies.

Policy module 200 may directly or indirectly control access to a secure element of TEE 90 that stores encryption keys and codes. This information may be used to decrypt or access certain application data stored in common repository 210. Policy module 200 may control access to a secure element using the same or different policies as those used to control access to common repository 210.

In certain circumstances, it may be advantageous for TEE 90 and OS environment 50 (or elements within each) to communicate with one another. Thus, device 80 may include application programming interfaces (APIs) to facilitate such communication. For example, within TEE 90 there may exist a TEE internal API 130. Within OS environment 50, there may exist a TEE client API 120. Communications can be facilitated and restricted by APIs 120 and 130.

The application data stored in common repository 210 may also be used to manage network connections of device 100. Thus, policy module 200 may facilitate access to such information, as permitted by the policies, to a network device that facilitates connecting device 80 to a network 70. For example, a network manager, such as a media gateway (MGW) 220 of network 70 may access application data stored in common repository 210. MGW 220 may slice network 70 based on the application data or its metadata, such as metadata indicating what application data is being accessed and by whom, or the like, to provide a network slice 60 for device 80. For example, the design of network slice 60 may depend upon a variety of factors and may be intended to provide support for the specific services that device 80 is using, such as cloud services 190. If device 80 is using network 70 for a first service that requires certain requirements (e.g., latency or bandwidth requirements) that differ from the requirements of a second service, network slice 60 may be designed to meet those requirements of the first service, while not necessarily meeting other requirements of network 70 that may be used for another service that device 80 is not using at that time.

For any given peripheral sensory devices 10, 20, 30, the collected sensory information can be controlled and handled by wearable apps 110 available in the OS environment 50 or TEE 90 depending upon the nature of the wearables application. The policies and security settings are managed by policy module 200 and can be dynamically changed by enabling the user to allow or disallow what sensory data each wearables app 110 may access according to the users' preferences and predetermined application restrictions. By changing the policy/security settings for each wearable app 110 in a dynamic manner, the user may enable other devices or applications to access data to/from the corresponding wearables app 110. In this manner, the user controls which wearables apps 110 and corresponding sensory devices 10, 20, 30 may access which data of other applications and corresponding sensory devices in the environment of the device 80.

In exemplary embodiments, the policy settings are modified to add the connected wearable devices 10, 20, 30 to the settings menu and the settings menu permits the user to specify which other connected devices 10, 20, 30 or network slices 60, for example, may access the data from the selected device whose settings are being modified. In exemplary embodiments, the user of the device 80 may be prompted when a wearable device 10, 20, 30 is recognized so that the user may update the policy/security settings or preferences for the detected wearable device 10, 20, 30 as appropriate. Alternatively, predetermined default settings may be provided when a wearable device 10, 20, 30 is detected. In exemplary embodiments, the policy/security settings are bidirectional and thus control the flow of data to/from the wearable devices 10, 20, 30. The settings are also dynamic in the sense that they may change at any time of day or under conditions set by the user or the wearable device 10, 20, 30.

As an example, a wearable 10, 20, 30 may capture data about where the user is and when by accessing GPS data from GPS sensor 180 integrated into the device 80. The policy module 200 provides the appropriate settings to permit this data exchange for a particular wearable device 10, 20, 30. The settings may be set according to the wearable device 10, 20, 30, or may be set by device variable, such as "location data," "barometric data," "blood pressure data," and the like, where the variable data is mapped to the device that may acquire such data. As a further example, the policy module 200 may also specify through the settings for the user's wearable device 10, 20, 30 whether or not GPS location data is to be recorded while a user stops to talk while running, for example. Thus, the sensor data may be stored in the common repository based on the type of sensor data and a sensor device may request data from the common repository based on type of sensor data irrespective of the sensor device used to obtain the sensor data of the requested type.

In this fashion, while the private information such as health and financial data stays secured, certain information can be shared with other devices and applications in the environment of the device 80. The systems and methods of the invention thus enable devices like a FITBIT™ to communicate with an associated device 80 and to use information from other sensory devices such as an integrated GPS 180 to provide more sophisticated data calculations. In the above example, the FITBIT™ may pull in GPS data and use the GPS data as metadata for processing.

Cloud Computing Environment. In addition to connected devices 10, 20, 30, trusted applications 100 may also be affiliated with one or more cloud services 190. For example, trusted application 100 may be affiliated with connected device 10 and a corresponding connected-device server in the connected device 10's cloud storage 190. Similarly, other trusted applications 100 may be affiliated with connected devices 20, 30 and corresponding connected-device servers of cloud storage 190. These elements may, in one or more different combinations, operate to provide or facilitate cloud services 190.

Policy module 200 may also control access to common repository 210 from cloud services 190. This may facilitate, if the policies of policy module 200 allow, cloud services 190 to benefit from or access data generated by trusted applications 100 or connected devices 10, 20, 30 that may not be directly linked together. For example, assume that connected device 10 comprises a fitness tracker developed by company A. The fitness tracker 10 works in conjunction with trusted application 100 to provide data to a corresponding device server in cloud services 190. If the fitness tracker 10 lacks a GPS chip, and trusted app 100 does not have access to this information, then cloud services 190 provided in conjunction with the fitness tracker 10 may be unable to map, for example, the user's jogging route. However, with the use of a common repository 210, if another trusted application 100 (alone or in conjunction with connected device 20, 30 does have access to GPS information), then cloud services 190 provided via trusted application 100 may make use of that GPS information via policy module 200.

Another exemplary embodiment utilizes the slicing capability of 5G networks whereby personal information that is shared with a certain slice 60 may also be dynamically shared with other devices in the environment of device 80 by first storing the personal information in a policy enforced (or user preferences) "personal cloud" within network 70 as implemented by a cloud service provider. For instance, if the user would like to share his/her activity with a family member or a physician, he/she can dynamically alter the policy rules and/or user preferences and sync the information between his/her personal cloud data and, for example, a Healthcare (HC) slice 60 in the network. In this case, the doctor could monitor a patient's activity directly while receiving other sensory information from the patient's device 80 as added metadata. Also, as an added service, the sensory data from other sensors and wearables in the environment of the device 80 may be aggregated and loaded into the appropriate slice 60 of the user's personal cloud as permitted by the corresponding policy/security settings for each sensor and wearable.

In exemplary embodiments, the systems and methods of the invention provide the ability to enrich the readings from wearable devices 10, 20, 30 such as a glucose reading from a wearable glucose sensor with added information such as a barometer reading for weather and GPS data for location of the patient. Also, data between different slices in the 5G network may be shared and initiated by the wearable's ability to include within the wearable data a number of sensory readings that are imported from the device 80, for example.

As further illustrated in FIG. 1, the wearables 10, 20, 30 provide data to wearable apps 110 running in the OS environment 50. In exemplary embodiments, the unrestricted wearables data may be shared locally with common apps 40 as in US 2016/0232318 and US 2017/001066 referenced above and/or may be provided through TEE client API 120 to TEE internal API 130 and to trusted apps 100 for storage of the sensory information in common repository 210 so long as the wearables data complies with the security policy check by policy module 200. TEE client API 120 and TEE internal API 130 permit the wearable apps 110 to communicate with the TEE 90 to push sensory data to the common repository 210 and, when appropriate, to access data from other sensory devices that has been stored in the common repository 210. For example, additional data may be dynamically instantiated and stored in common repository 210 from integrated or add-on sensory devices such as Bluetooth/NFC element 170 or GPS element 180 under control of device management function control element 150. As shown, the "latest reading" from the integrated or add-on sensory devices is stored in latest reading cache memory element 140 under control of device management functionality 150. Device management functionality 150 may further communicate with other integrated or add-on devices via policy controlled connection 160 using Bluetooth, NFC, or other wireless connection devices 170. Device management functionality 150 thus interfaces with all integrated or add-on devices of the device 80 to push out or to pull in the latest readings from/to the latest reading cache memory element 140 and to permit trusted applications 100 to access the updated data in common repository 210 as a variable (e.g., location and speed data from GPS) in accordance with the techniques described herein.

The wearables 10, 20, 30 also may share data directly with cloud services 190 associated with the respective wearables 10, 20, 30 via a wireless connection in the conventional fashion as illustrated by the bi-directional arrow between wearable apps 110 and cloud service devices 190 in FIG. 1. However, in accordance with exemplary embodiments, mechanisms may also be provided to determine if the data stored in the common repository 210 may be shared with the cloud service devices 190 and/or with the user's personal cloud in network 70. In such cases, the policy module 200 checks the data security policies to determine if sharing of the data with the corresponding wearable device's cloud storage 190 (e.g., Fitbit™ cloud) or personal cloud in network 70 is permitted. If so, the sensory data is pushed to the wearable device's cloud storage 190 or personal cloud in network 70 in the conventional fashion. Also, if proper permissions are given from policy module 200 to the cloud storage device 190 for a particular wearable device (see arrow between cloud storage device 190 and policy module 200), sensory data may be provided from the user's personal cloud in network 70 to the cloud storage 190 for the corresponding wearable device 10, 20, 30.

By way of example, the user may submit preconfigured security requirements for data from the user, a particular carrier, or device for transmission over a carrier signal to the smart phone 80 and/or to the cloud services 190. An advantage of this approach is that the user can dynamically change the policy/security features stored in policy module 200 of the device 80. For example, the user may create an application within the TEE 90 to accept sensory inputs from trusted apps 100 or common apps 40 and then decide if the sensory inputs may be accepted for local storage and/or transfer to another device. An encryption key and/or codes may be provided that enables any connected device to access data stored in the common repository 210. In exemplary embodiments, the common repository 210 may be dynamically sized to permit permanent or temporary storage of wearables data. The common repository 210 may also be directly accessed by the user's personal cloud 70 servers if appropriate permissions are provided, which may be provided in the cloud or in the device. For example, the exchange of data may be permitted if acceptable encryption is applied to the data being transmitted to/from the user's device 80.

Separately, the device management functionality 150 may control the loading of the integrated or add-on sensor data in the common repository 210 based upon dynamic policy/security features provided in the conventional manner by the settings of the device 80. In operation, the TEE client API 120 may ask for GPS data from the GPS sensor 180 to retrieve the latest information from the common repository 210 to share with the wearables 10, 20, 30. The data stored in the common repository 210 is updated when the new information is identified as different from the stored information and the device management functionality 150 is triggered to update information stored in the wearables 10, 20, 30 when such wearable devices ask for updated GPS information. It will be appreciated that the GPS functionality may be available in the device 80 or may be available in a wearable such as an Apple watch having built-in GPS capability. In exemplary embodiments, the wearable devices must subscribe to get the data updates but then may inform the user with the updated data. The TEE client API 120 preferably talks with the TEE internal API 130 to determine what data updates are required. The device management functionality 150 checks the "latest reading" in the "latest reading" cache 140 against the value stored in the common repository 210 before data is transmitted to verify that the most recent reading is being sent to the wearables 10, 20, 20 in response to a request for data. In particular, the common repository 210 compares the time stamp and type of data received with the stored data in latest reading cache 140. If more recent data is available in the common repository 210, the more recent data is pulled from the common repository 210 and provided via the TEE internal API 130 and TEE client API 120 to the corresponding wearables app 110. However, if more current data is not available in the common repository 210, then the latest reading data is pulled from the latest reading cache 140 and provided in response to the data request.

Figure 2:
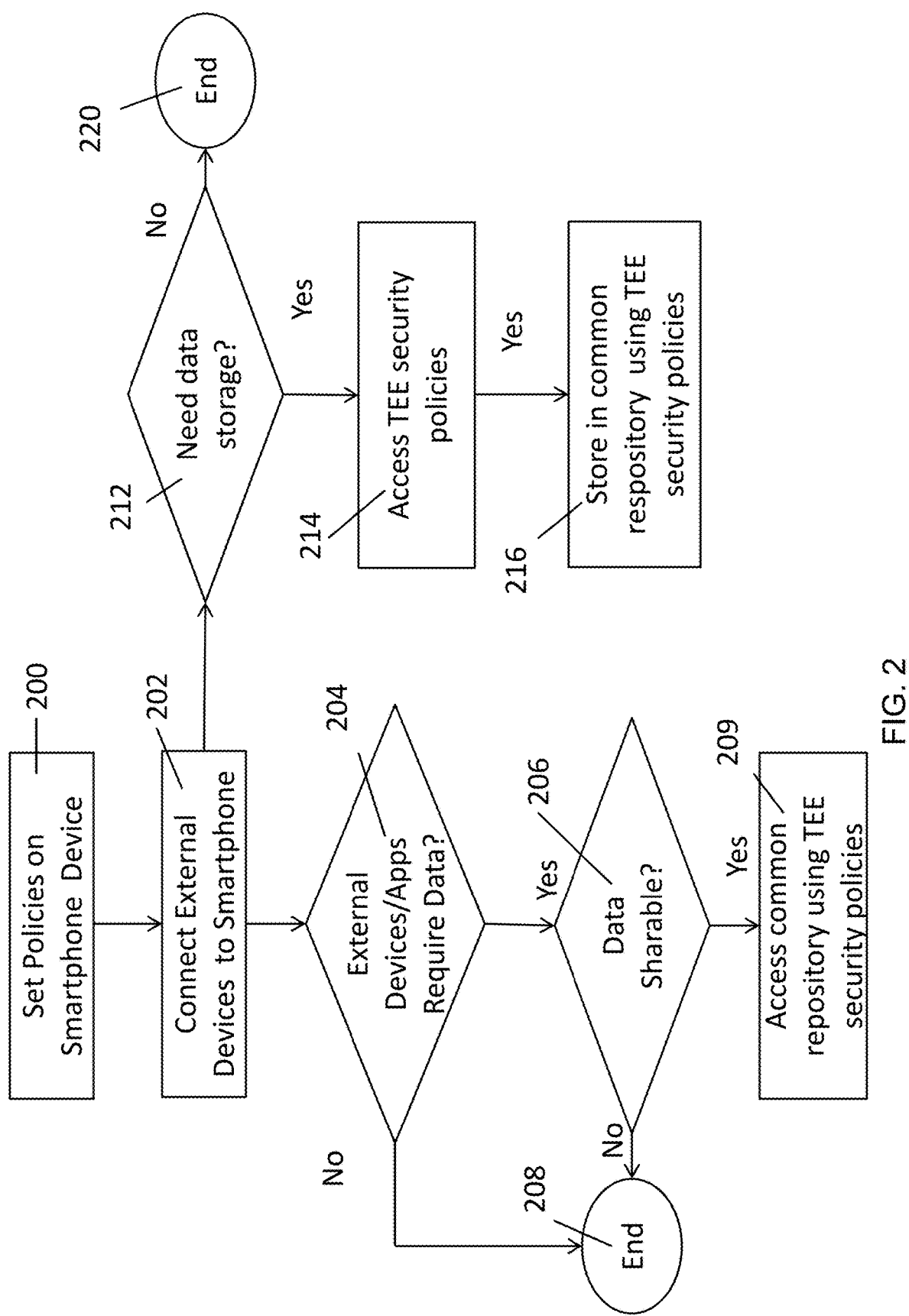
FIG. 2 illustrates an exemplary method using a common repository in a device in accordance with an embodiment of the present invention.

Methods of Use. FIG. 2 shows an exemplary flow diagram illustrating the storing and access to data stored in common repository 210. At 200, policies for the smart phone or other device 80 are set. At 202, external devices, if any, are connected to the device 80. At 204, the decision block as to whether a common application 40, trusted application 100 or external device 10, 20, 30 require data from common repository 210. If so, then at 206, the decision is made as whether the requested data is sharable with the requested application or device based on the policies currently in place from step 200. If the data is sharable, then access to the data in the common repository 40 is provided at 209. If the sensory devices 10, 20, 30 do not require or request data from the common repository or the data requested is not sharable, that portion of the flow diagram ends at 208.

Continuing with the other portion of FIG. 2, at 212 a decision is made as to whether the external devices or applications require data to be stored in the common repository. If not, then the process ends at 220. If the external devices or applications require data storage, then at 214, the device will access the security policies for that particular security device to determine whether and to what degree that data is sharable with other connected devices or applications. At 216, the data is stored using the TTE policies currently in place. If the data is not subject to any further restrictions on access or use, then the data is stored generally in the common repository 210 for free access to other external devices or applications. If the data is subject to further restrictions on access or use, then the data is retrievable only in accordance with the policies in place.

Figure 3:
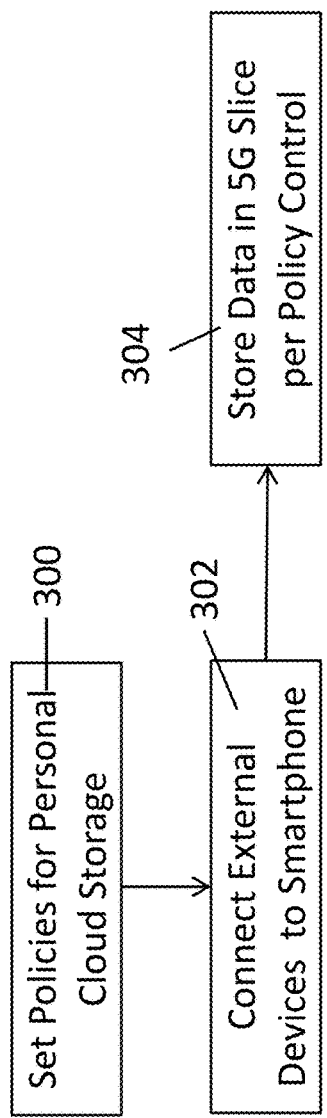
FIG. 3 illustrates an exemplary method of storing data in a 5G personal cloud environment in accordance with the present invention.

As mentioned above, the present disclosure may be implemented in a 5G environment wherein personal cloud storage is used as a form of a common repository. FIG. 3 shows an exemplary method in accordance with the present disclosure for an external device 10, 20, 30 operating in conjunction with device 80 in a 5G environment to store data in a personal cloud. At 300, the policies for personal cloud storage are set for each application and external device 10, 20, 30. At 302, the external device 10, 20, 30 is connected to a smartphone or other device 80. At 304, data from the external device 10, 20, 30 is stored in a slice of the personal cloud in accordance with the policies in place at the time.

Figure 4:
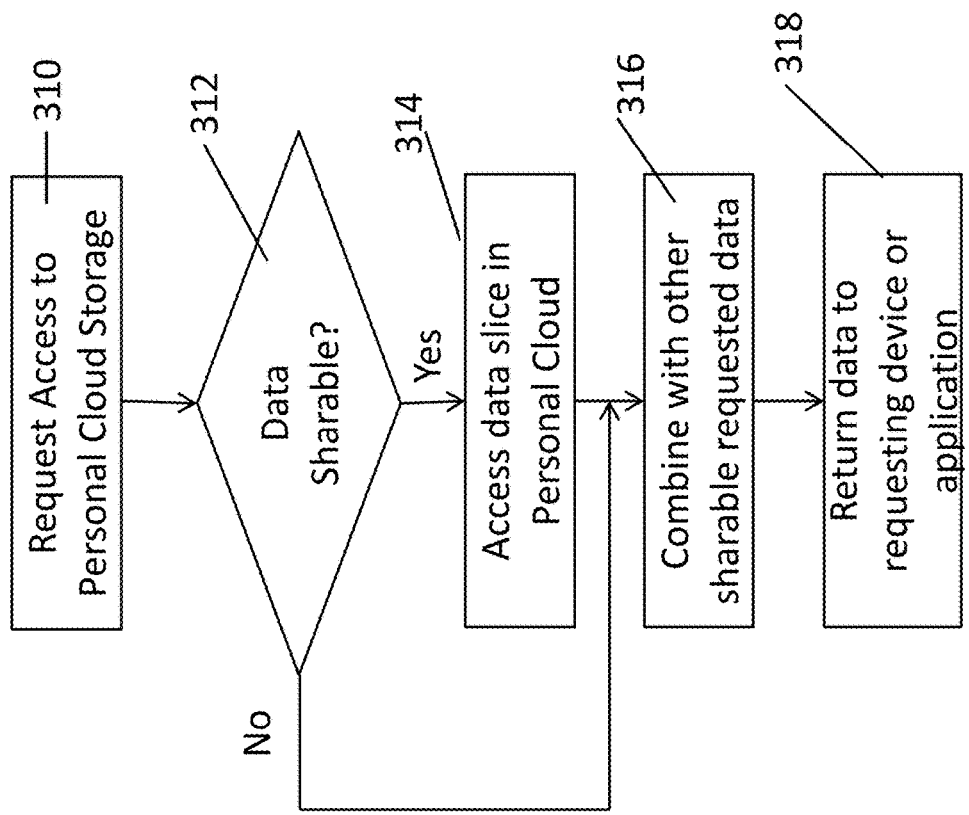
FIG. 4 illustrates an exemplary method of retrieving data in a 5G personal cloud environment in accordance with the present invention.

With reference to FIG. 4, there is shown an exemplary process flow for retrieving data by an external device or an application from personal cloud storage. At 310, request for access to the data in cloud storage is made by the external device 10, 20, 30 through the device 80. At 312, the request is analyzed to determine whether the data requested is sharable with the requesting application or external device 10, 20 30 in accordance with the policies currently in place. If so, then that part of the storage is access and data retrieved at 314. If not, there may be other data that is sharable. For example, a FITBIT® device may have access to previous distances travelled in its own storage slice as well as GPS information from the device 80 that is generally available to all external devices 10, 20, 30 and applications but is not permitted access to other health data such as blood pressure readings or cholesterol readings. At 316, all data that is sharable is assimilated and that data is returned to the external device 10, 20, 30 at 318.

Exemplary control flows for the propagation of information captured by the respective wearables 10, 20, 30 are also shown in FIG. 1. In a first control flow, the wearables data from wearables 10, 20, 30 is provided to wearables app 110 at (1). The wearables data is then provided to TEE client API 120 at (2) for communicating at (3) into the TEE 90 via TEE internal API 130. At (4), the wearables data is provided to trusted apps 100 to provide access control by communicating the wearables data at (5) to policy module 200 to check the policies to determine what level, if any, security is required prior to storing the data in the common repository 210. The wearables data is provided at (6) to the common repository 210 for storage. The wearables data may also be sent to a third party service provider for storage in a wearables device cloud 190 and/or the user's personal cloud in network 70 as illustrated. Conversely, access by the wearable 10, 20, 30 to the data stored in the common repository 210 is granted using a subscriber approving concept and the requested data is returned to the wearables app 110 in the reverse of the first control flow steps (1)-(6).

On the other hand, in a second control flow, sensory data from integrated devices such as GPS sensor 180 is stored in the latest reading cache 140 at (8) at a designated sampling rate. The "latest readings" are acquired from the latest reading cache 140 at (7) upon request from a wearable device having the appropriate policy and security for accessing the latest readings. The latest reading may be stored in the common repository 210 for return via the first control flow or may be provided directly to the TEE internal API 130 to return to the wearables app 110 that requested the sensory data (for example, a GPS reading) by sending an access request through the TEE client API 120 to the TEE internal API 130 to provide a retrieval request to the common repository 210. In exemplary embodiments, if the data stored in the common repository 210 is not the most current reading, the common repository 210 may pull the latest sensory data from the latest reading cache 140 or, as appropriate, may pull data from a wearable app 110 for the wearable 10, 20, 30 that is gathering the requested sensory data.

Those skilled in the art will appreciate that, as a general rule, the integrated or add-on sensors typically accessible through a device 80 via policy controlled connection 160 do not generate information that changes too fast to permit periodic updating of the data in response to a trigger as opposed to providing a steady data stream to the smart phone 80. Typically, the device management functionality 150 would send a trigger to the remote device or sensors to send the updated data. The timestamp of the received data triggers the retrieval of data from the common repository 210 when the received data is older than the data stored in the latest reading cache 140. Logic at the common repository 210 compares the timestamps for such determinations. In this fashion, any smart devices or sensors in the possession of the user/owner of the smartphone 80 may access data stored in the common repository 210 that may have been provided by other sensors, wearable devices, or by cloud services 190 to enrich the captured data or to provide additional services in a seamless manner.

It will be appreciated that the data provided by the integrated sensors or add-on sensors also may be proliferated to 3rd party providers via policy module 200 and the 5G network 70 as illustrated in FIG. 1. In this fashion, the sensory devices 10, 20, 30 in the user's environment get the benefit of updated data provided to the common repository 210 from other network devices while also providing a way for the data from the sensory devices 10, 20, 30 to supplement the readings of other sensory devices in the user's environment and/or to provide readings over cloud services to other local or remote devices.

The system described herein may be adapted for use with any sensory device with any capability. For example, the device 80 may include an app for flying a drone using smart phone controls by incorporating GPS information from the GPS sensors 180 of device 80. In addition, heart rate monitor data from a local wearable 10, 20, 30 may be stored in the common repository 210 to satisfy HIPAA requirements yet the heart rate monitor data would be available for use by a local glucose monitor 20 or other local wearable to create a local ecosystem of monitoring devices connected to the device 80. Since the GPS and/or heart rate monitor data is available locally, no passwords and the like are needed for accessing a third party server where such data would be uploaded. In the example of a slice network 60, the slice network 60 in the user's personal cloud of network 70 may be accessed directly by trusted apps 100 in TEE 90 via policy module 200. The policies implemented by the policy module 200 would thus determine what data may be made available to a network and what data would have priority for such consideration. The policies implemented by the policy module 200 would also determine what third party data may be accepted by the device 80 for local storage in the common repository 210.

While examples of a device such as a smart phone adapted to enable communication amongst a plurality of associated smart sensor devices has been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium as described herein is not a signal, a transient signal, or a propagating signal. A computer-readable storage medium as described herein is instead an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with a figure, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the invention as illustrated in the figure, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method of sharing information between a connected device of a user and a portable processing user device of the user in communication with the connected device and wherein the connected device has access to first sensory data generated by the connected device, comprising:
    receiving, by the portable processing user device, a request from the connected device for access to second sensory data generated by a native application on the portable processing user device;
    the portable processing user device evaluating policy restrictions associated with the second sensory data requested by the connected device;
    evaluating, by the portable processing user device, second sensory data requested by the connected device in view of the policy restrictions wherein the second sensory data requested is not otherwise accessible by the connected device; and
    if the requested second sensory data may be shared with the connected device, then the portable processing user device providing access to the second sensory data requested by the connected device.

2. The method of claim 1 further comprising setting policy restrictions as a function of one of the connected device, subscriber preferences, or security requirements.

3. The method of claim 1 further comprising storing portable processing second device sensory data in memory associated with the portable processing user device and making the second sensory data available to the connected device.

4. The method of claim 3 wherein the memory is a common repository on the portable processing user device.

5. The method of claim 3 wherein the memory is located in a cloud-based storage area associated with the user.

6. The method of claim 3 wherein the second sensory data is derived from hardware or software on the portable processing user device.

7. The method of claim 6 wherein the second sensory data is time-stamped such that the most recent second sensory data is made accessible to the connected device.

8. The method of claim 6 wherein the second sensory data is time stamped and updating the second sensory data if more recent data is available.

9. The method of claim 1 further comprising storing first sensory data using the portable processing user device in accordance with the policies.

10. The method of claim 9 wherein the first sensory data is stored in a common repository on the portable processing user device.

11. The method of claim 9 wherein the second sensory data is made available to a second connected device connected to the portable processing user device in accordance with policies.

12. The method of claim 9 wherein the first sensory data is stored in a personal-cloud-based storage area.

13. The method of claim 12 wherein the first sensory data is made available to an external application with access to the cloud-based storage area in accordance with the policies.

\* \* \* \* \*